(12) United States Patent
Hewett (10) Patent No.: US 10,551,159 B1
(45) Date of Patent: Feb. 4, 2020

(54) MULTI-USE TAPE MEASURE (71) Applicant: Matthew Hewett, Saint Cloud, FL (US)

(72) Inventor: Matthew Hewett, Saint Cloud, FL (US)

( * ) Notice: Subject to any disclaimer, the term of this patent is extended or adjusted under 35 U.S.C. 154(b) by 191 days.

(21) Appl. No.: 15/865,351

(22) Filed: Jan. 9, 2018

(51) Int. Cl.
*G01B 3/10* (2006.01)
*G01C 9/34* (2006.01)

(52) U.S. Cl.
CPC ......... *G01B 3/1084* (2013.01); *G01B 3/1041* (2013.01); *G01B 3/1056* (2013.01); *G01B 3/1082* (2013.01); *G01C 9/34* (2013.01); *G01B 2003/1043* (2013.01); *G01B 2003/1046* (2013.01); *G01B 2003/1048* (2013.01); *G01B 2003/1051* (2013.01); *G01B 2003/1089* (2013.01); *G01B 2003/1092* (2013.01)

(58) Field of Classification Search
CPC .......... G01B 3/1056; G01B 2003/1089; G01B 3/1084; G01B 3/1082; G01B 3/1071; G01B 3/1041; G01B 2003/1053; G01B 2003/1046
USPC .................................................... 33/755–771
See application file for complete search history.

(56) References Cited

U.S. PATENT DOCUMENTS

| 4,296,554 | A | 10/1981 | Hammerstrom |
| 4,786,010 | A | 11/1988 | Dynan |
| D320,570 | S | 10/1991 | Lin |
| 5,937,532 | A | 8/1999 | Eirich |
| 6,338,204 | B1 | 1/2002 | Howle |
| 6,370,790 | B1 | 4/2002 | Stenger |
| 6,578,274 | B1* | 6/2003 | Tango, Jr. ............... B44D 3/38 33/1 G |
| 6,725,560 | B2 | 4/2004 | Smith |
| 7,269,913 | B2 | 9/2007 | Holevas |
| 7,549,235 | B2* | 6/2009 | Alders ................ G01B 3/1084 33/760 |
| 7,631,439 | B2* | 12/2009 | Black ................... G01B 3/1082 33/1 SB |
| 8,684,295 | B2* | 4/2014 | Taketsuna .......... B65H 75/4431 242/378.4 |
| 9,354,031 | B1* | 5/2016 | Darr ..................... G01B 3/1084 |
| 2004/0172839 | A1 | 9/2004 | Zirk |
| 2005/0155245 | A1* | 7/2005 | Panosian .............. G01B 3/1084 33/760 |
| 2007/0074418 | A1* | 4/2007 | Critelli ................. G01B 3/1056 33/758 |
| 2007/0101600 | A1* | 5/2007 | Alders ................ G01B 3/1084 33/760 |
| 2007/0214674 | A1 | 9/2007 | Erisoty |

(Continued)

Primary Examiner — Yaritza Guadalupe-McCall
(74) Attorney, Agent, or Firm — Kyle A. Fletcher, Esq.

(57) ABSTRACT

The multi-use tape measure comprises a semi-rigid tape measure, a flexible tape measure, a marking implement, a pencil holder, a first and second bubble level, a writing surface, and a magnetic mount in a single a case. The semi-rigid tape measure and the flexible tape measure may be deployed from within the case to make distance measurements and may then retracted back into the case. The marking implement may be tethered to prevent loss and may be used to mark a measured distance and then stored within a cavity of the case. The pencil holder may be deployed to guide the pencil in making an accurate measurement mark and may then be stored within the case. The first and second bubble levels may be used to verify level and plumb. The writing surface may record measurements. The magnetic mount may hold the case in place.

16 Claims, 5 Drawing Sheets (56) References Cited

U.S. PATENT DOCUMENTS

| | | | |
|---|---|---|---|
| 2008/0256816 A1* | 10/2008 | Cosentino | B26B 5/001 33/760 |
| 2009/0288307 A1* | 11/2009 | Zhou | G01B 3/1056 33/758 |
| 2012/0240419 A1* | 9/2012 | Wagner | B43L 7/12 33/275 R |
| 2014/0109417 A1* | 4/2014 | Kocenko | G01B 3/1084 33/414 |

* cited by examiner

MULTI-USE TAPE MEASURE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of tools, more specifically, a multi-use tape measure.

SUMMARY OF INVENTION

The multi-use tape measure comprises a semi-rigid tape measure, a flexible tape measure, a marking implement, a pencil holder, a first and second bubble level, a writing surface, and a magnetic mount in a single a case. The semi-rigid tape measure and the flexible tape measure may be deployed from within the case to make distance measurements and may then retracted back into the case. The marking implement may be tethered to prevent loss and may be used to mark a measured distance and then stored within a cavity of the case. The pencil holder may be deployed to guide the pencil in making an accurate measurement mark and may then be stored within the case. The first and second bubble levels may be used to verify level and plumb. The writing surface may record measurements. The magnetic mount may hold the case in place.

An object of the invention is to provide a multi-use tape measure.

Another object of the invention is to semi-rigid and flexible measuring tapes.

A further object of the invention is to provide two bubble levels to check for level and plumb surfaces.

Yet another object of the invention is to provide a marking implement, a pencil guide for accurate measurements, and a white board for recording measurements.

These together with additional objects, features and advantages of the multi-use tape measure will be readily apparent to those of ordinary skill in the art upon reading the following detailed description of the presently preferred, but nonetheless illustrative, embodiments when taken in conjunction with the accompanying drawings.

In this respect, before explaining the current embodiments of the multi-use tape measure in detail, it is to be understood that the multi-use tape measure is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the multi-use tape measure.

It is therefore important that the claims be regarded as including such equivalent construction insofar as they do not depart from the spirit and scope of the multi-use tape measure. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
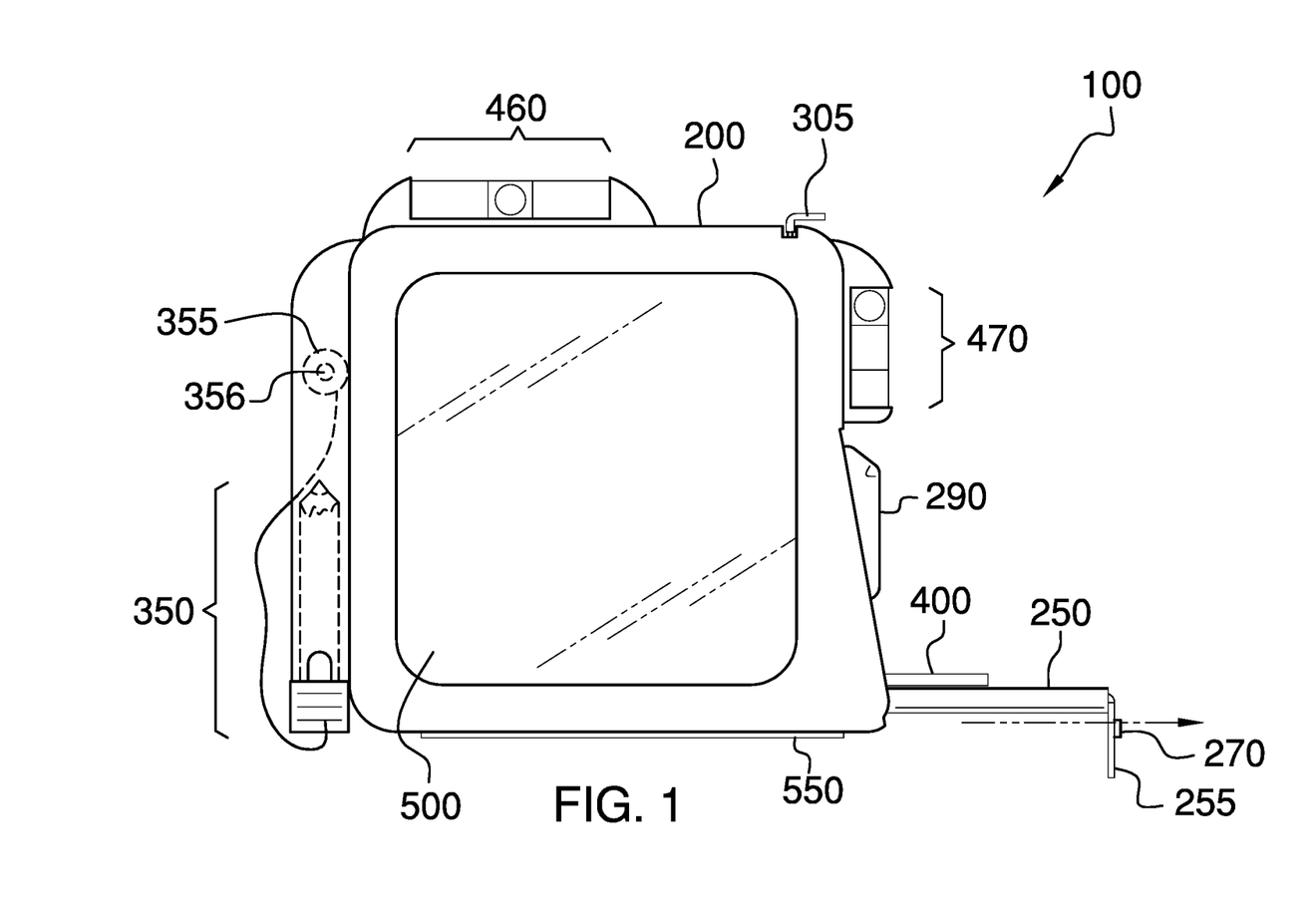
FIG. 1 is a left side view of an embodiment of the disclosure.
Figure 2:
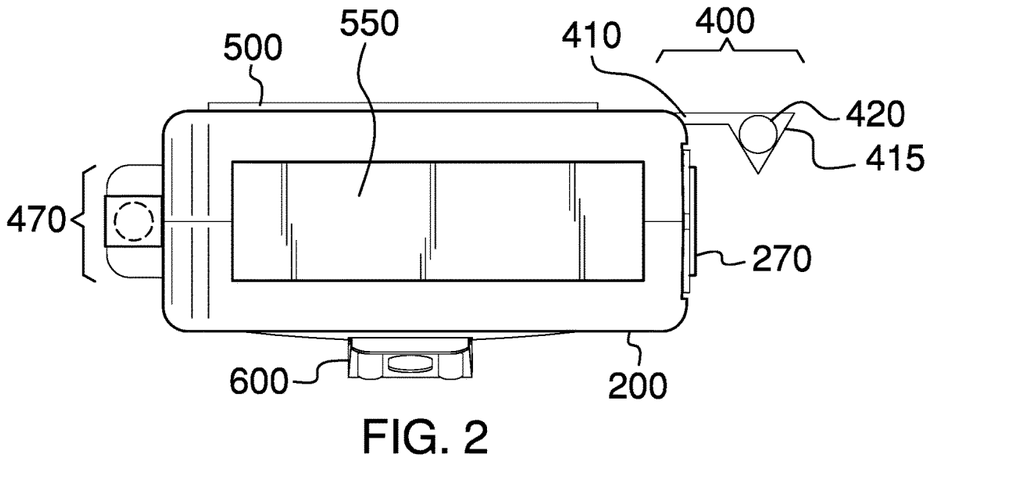
FIG. 2 is a bottom view of an embodiment of the disclosure.
Figure 3:
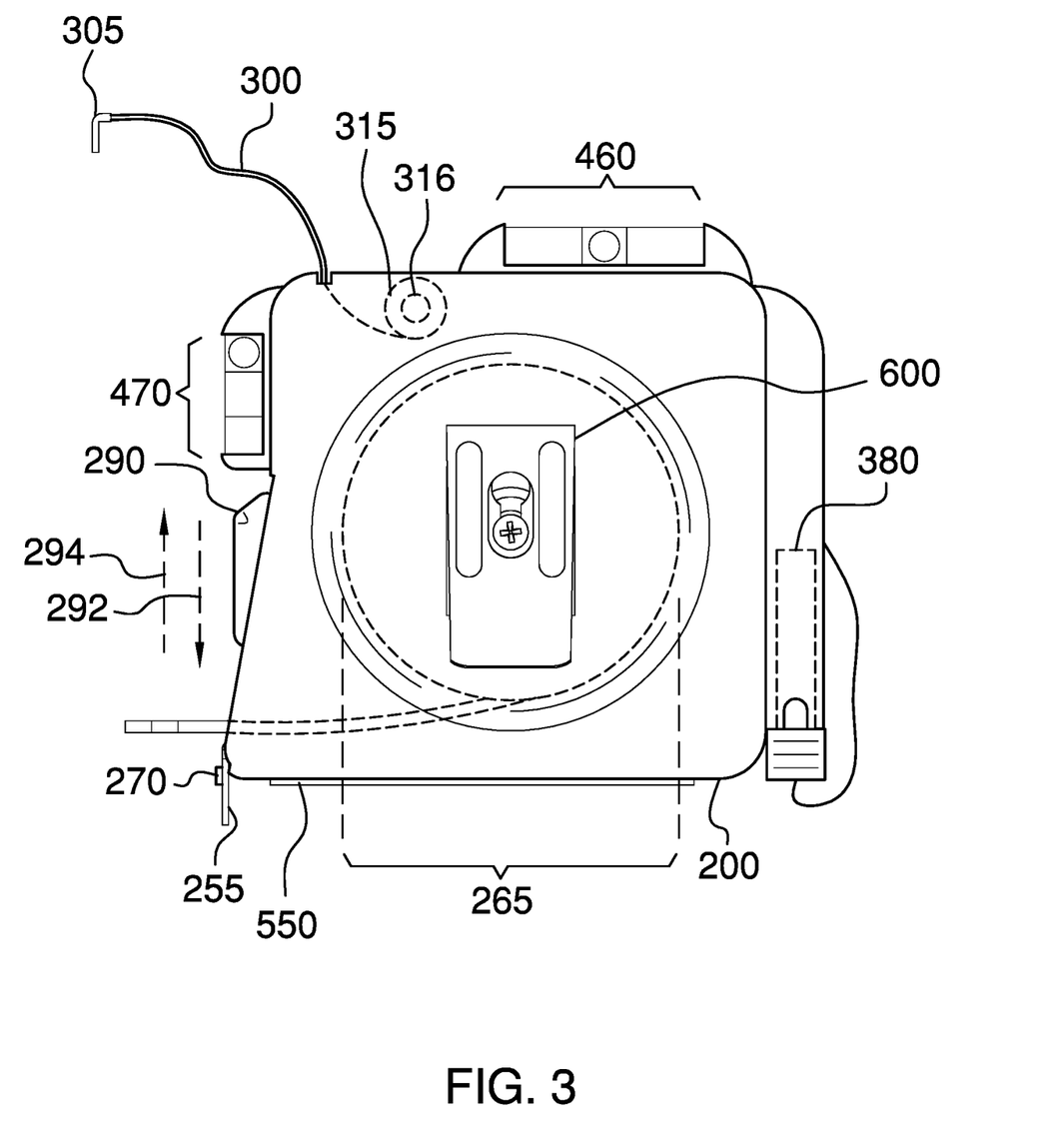
FIG. 3 is a right side view of an embodiment of the disclosure.
Figures 4, 5:
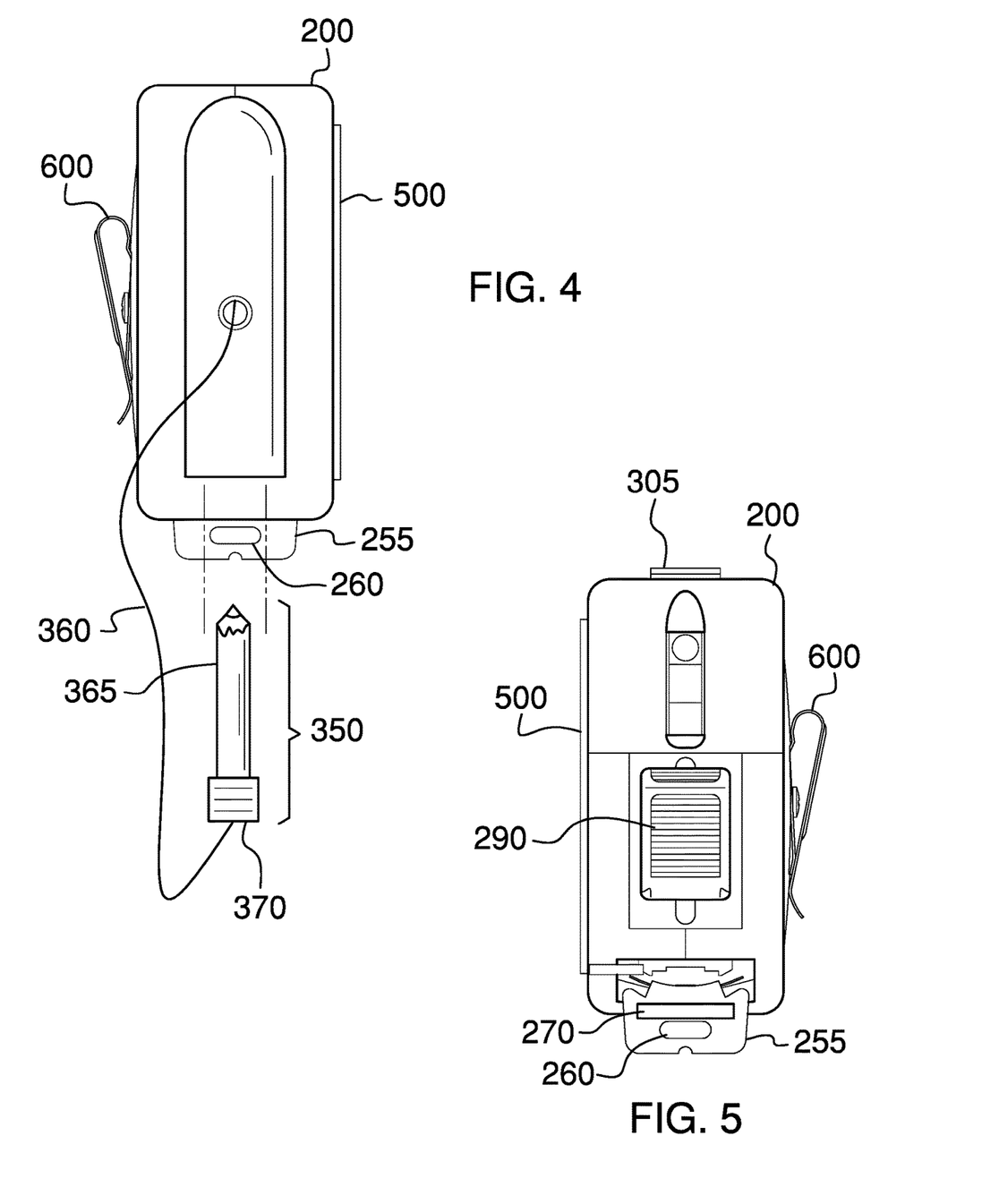
FIG. 4 is a rear view of an embodiment of the disclosure.
FIG. 5 is a front view of an embodiment of the disclosure.
Figure 6:
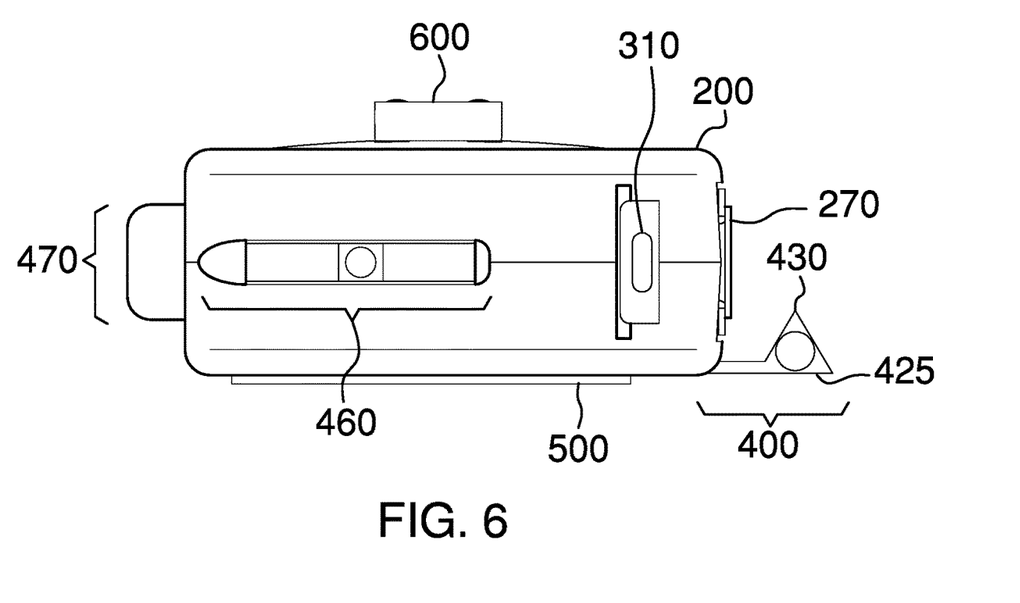
FIG. 6 is a top view of an embodiment of the disclosure.

Detailed reference will now be made to a first potential embodiment of the disclosure, which is illustrated in FIGS. 1 through 6.

The multi-use tape measure 100 (hereinafter invention) comprises a case 200, a semi-rigid tape measure 250, a flexible tape measure 300, a marking implement 350, a pencil holder 400, a first bubble level 460, a second bubble level 470, a writing surface 500, and a magnetic mount 550. The invention 100 may be a measuring tool that is adapted to provide multiple elements useful by a craftsman (not illustrated in the figures). The multiple elements may measure straight-distance lengths, may measure curved lengths, may detect that surfaces are level or plumb, may provide a place to record measurements, may mark materials, and may hold the invention 100 in place.

The case 200 may be a housing for the semi-rigid tape measure 250, the flexible tape measure 300, the marking implement 350, the pencil holder 400, the first bubble level 460, the second bubble level 470, and the writing surface 500. The case 200 is defined by a top, a bottom, a front, a rear, a left, and a right. The bottom is defined to be the side where the magnetic mount 550 is located. The top is the side that is opposite the bottom. The front is defined to be the side where the semi-rigid tape measure 250 emerges. The rear is defined to be the side that is opposite the front. The left is defined to be the side where the writing surface 500 is located. The right is defined to be the side that is opposite the left. The case 200 may present a square profile when viewed from the left or the right side and may present a rectangular profile when viewed from the front, the rear, the top, or the bottom. The case 200 may be fabricated from plastic, metal, or another resilient material. In some embodiments, the dimensions of the case 200 may be approximately 3 inches tall as measured from top to bottom, 3 inches deep as measured from front to rear, and 1⅜ inches wide as measure from left to right.

The semi-rigid tape measure 250 may be a ribbon of a semi-rigid material that is marked with first measurement indicia (not illustrated in the figures). In some embodiments, the semi-rigid tape measure 250 may be fabricated from metal. As a non-limiting example, the metal may be steel. Because of the semi-rigid nature of the semi-rigid tape measure 250, the semi-rigid tape measure 250 may be useful for making straight-line measurements from a first point to a second point.

The semi-rigid tape measure 250 may be coiled within a first spring-loaded retraction mechanism 265 inside of the case 200 with one end of the semi-rigid tape measure 250 coupled to the first spring-loaded retraction mechanism 265 inside of the case 200 and the other end of the semi-rigid tape measure 250 coupled to a first hooked tab 255 outside of the case 200. The semi-rigid tape measure 250 may be extended for use by manually pulling on the first hooked tab 255 to withdraw the semi-rigid tape measure 250 from within the case 200.

The first hooked tab 255 may be a metal tab bent into a right-angle. The first hooked tab 255 may be attached to an edge of an object being measured, thus securing one end of the semi-rigid tape measure 250, while the case 200 is moved away from the corner to withdraw the semi-rigid tape measure 250. The first hooked tab 255 may prevent the first spring-loaded retraction mechanism 265 from pulling the semi-rigid tape measure 250 entirely into the case 200. The first hooked tab 255 may comprise a first slotted aperture 260 that allows the first hooked tab 255 to be coupled to the head of a nail as an anchor point for a measurement. In some embodiments, the first hooked tab 255 may comprise a magnetic tip 270 to couple the first hooked tab 255 to a metal object.

The first measurement indicia may be numbers, letters, lines, symbols, variations in coloring, or a combination thereof that appear on the semi-rigid tape measure 250. The first measurement indicia may indicate one or more distances from the first hooked tab 255 end of the semi-rigid tape measure 250 to the points on the semi-rigid tape measure 250 where the first measurement indicia appear. The first measurement indicia may be in metric units of meters, cm, and mm, English units of feet, inches, and fractional inches, or a combination thereof. The first measurement indicia may comprise truss markings, stud markings, and/or other application specific markings.

The semi-rigid tape measure 250 may comprise the first spring-loaded retraction mechanism 265. The first spring-loaded retraction mechanism 265 may comprise a first axle (not illustrated in the figures) and a first spring (not illustrated in the figures). The first axle may be a cylinder around which the semi-rigid tape measure 250 is wound. The first axle may be rotationally coupled to the inside left and right walls of the case 200 at the center of the left and right side walls. The first spring may be coupled to the first axle and to one of the side walls of the case 200 such that rotation of the first axle in a first rotational direction when the semi-rigid tape measure 250 is withdrawn causes tension of the first spring and stores energy in the first spring. If the force causing the withdrawal of the semi-rigid tape measure 250 is removed, the energy stored in the first spring may then cause rotation of the first axle in a second rotational direction, where the second rotational direction is opposite of the first rotational direction. Rotation in the second rotational direction may cause the semi-rigid tape measure 250 to be retracted into the case 200 and to wrap around the first axle.

The invention 100 may comprise a tape lock 290 located on the front side of the case 200. When the tape lock 290 is in a locked position 292, the tape lock 290 may prevent the semi-rigid tape measure 250 from moving. When the tape lock 290 is in an unlocked position 294, the tape lock 290 may permit movement of the semi-rigid tape measure 250. As a non-limiting example, the tape lock 290 may comprise a device that slides against and jambs the semi-rigid tape measure 250 when the tape lock 290 is in the locked position 292 and which slides away from and clears the semi-rigid tape measure 250 when the tape lock 290 is in the unlocked position 294.

The flexible tape measure 300 may be a ribbon of a flexible material that is marked with second measurement indicia (not illustrated in the figures). In some embodiments, the flexible tape measure 300 may be fabricated from cloth, plastic, or fiberglass. Because of the flexible nature of the flexible tape measure 300, the flexible tape measure 300 may be useful for making measurements on curved surfaces. As a non-limiting example, the flexible tape measure 300 may be wrapped around a cylindrical object such as a pipe to measure the circumference of the pipe.

The flexible tape measure 300 may be coiled within a second spring-loaded retraction mechanism 315 inside of the case 200 with one end of the flexible tape measure 300 coupled to the second spring-loaded retraction mechanism 315 inside of the case 200 and the other end of the flexible tape measure 300 coupled to a second hooked tab 305 outside of the case 200. The flexible tape measure 300 may be extended for use by manually pulling on the second hooked tab 305 to withdraw the flexible tape measure 300 from within the case 200.

The second hooked tab 305 may be a metal tab bent into a right-angle. The second hooked tab 305 may be attached to an edge of an object being measured, thus securing one end of the flexible tape measure 300, while the case 200 is moved away from the corner to withdraw the flexible tape measure 300. The second hooked tab 305 may prevent the second spring-loaded retraction mechanism 315 from pulling the flexible tape measure 300 entirely into the case 200. The second hooked tab 305 may comprise a second slotted aperture 310 that allows the second hooked tab 305 to be coupled to the head of a nail as an anchor point for a measurement.

The second measurement indicia may be numbers, letters, lines, symbols, variations in coloring, or a combination thereof that appear on the flexible tape measure 300. The second measurement indicia may indicate one or more distances from the second hooked tab 305 end of the flexible tape measure 300 to the points on the flexible tape measure 300 where the second measurement indicia appear. The second measurement indicia may be in metric units of meters, cm, and mm, English units of feet, inches, and fractional inches, or a combination thereof. The second measurement indicia may comprise truss markings, stud markings, and/or other application specific markings.

The flexible tape measure 300 may comprise the second spring-loaded retraction mechanism 315. The second spring-loaded retraction mechanism 315 may comprise a second axle 316 and a second spring (not illustrated in the figures). The second axle may be a cylinder around which the flexible tape measure 300 is wound. The second axle 316 may be rotationally coupled to the inside left and right walls of the case 200 at the top front quadrant of the left and right side walls. The second spring may be coupled to the second axle 316 and to one of the side walls of the case 200 such that rotation of the second axle 316 in a third rotational direction when the flexible tape measure 300 is withdrawn causes tension of the second spring and stores energy in the second spring. If the force causing the withdrawal of the flexible tape measure 300 is removed, the energy stored in the second spring may then cause rotation of the second axle 316 in a fourth rotational direction, where the fourth rotational direction is opposite of the third rotational direction. Rotation in the fourth rotational direction may cause the flexible tape measure 300 to be retracted into the case 200 and to wrap around the second axle 316.

The marking implement 350 comprises a third spring-loaded retraction mechanism 355, a pencil 365, a pencil clip 370, and a tether 360. The pencil 365 may couple to the pencil clip 370 in such a way that the pencil 365 may be detached from the pencil clip 370 for the purpose of replacing the pencil 365. As a non-limiting example, the end of the pencil 365 that is opposite the point of the pencil 365 may press into the pencil clip 370 and may be held there by a friction fit. When the pencil 365 is not in use, it may be stored within a pencil cavity 380.

The tether 360 may be a string, cord, or other tether line that is coupled at one end to the third spring-loaded retraction mechanism 355 and at the other end to the pencil clip 370. The tether 360 may serve to prevent loss of the pencil 365.

The third spring-loaded retraction mechanism 355 may comprise a third axle 356 and a third spring (not illustrated in the figures). The third axle 356 may be a cylinder around which the tether 360 is wound. The third axle 356 may be rotationally coupled to the inside left and right walls of the case 200 at the top rear quadrant of the left and right side walls. The third spring may be coupled to the third axle 356 and to one of the side walls of the case 200 such that rotation of the third axle 356 in a fifth rotational direction when the tether 360 is withdrawn causes tension of the third spring and stores energy in the third spring. If the force causing the withdrawal of the tether 360 is removed, the energy stored in the third spring may then cause rotation of the third axle 356 in a sixth rotational direction, where the sixth rotational direction is opposite of the fifth rotational direction. Rotation in the sixth rotational direction may cause the tether 360 to be retracted into the case 200 and to wrap around the third axle 356.

The pencil holder 400 may be a guide that slides into and out of the front of the case 200 above the semi-rigid tape measure 250. In some embodiments, the distance from the semi-rigid tape measure 250 to the pencil holder 400 may be ¼ inch. The pencil holder 400 may be deployed for use by pulling the pencil holder 400 out of the case 200 and may be stored by pushing the pencil holder 400 into the case 200.

The pencil holder 400 may comprise an arm 410, a pointer 415, and a pencil aperture 420. The arm 410 may be an armature that is slidably coupled to the case 200. An internal end of the arm 410 may be retained within the case 200 while an external end of the arm 410 may be coupled to the pointer 415. In some embodiments, the arm 410 may lock into place when the pencil holder 400 is deployed, when the pencil holder 400 is stored, or both. As a non-limiting example, the arm 410 may lock into place by action of a detent mechanism.

The pointer 415 may be oriented horizontally. The pointer may be the shape of an isosceles or equilateral triangle. A base of the triangle 425 may be coupled to the arm 410 such that the base of the triangle 425 aligns with the arm 410 along a front-to-rear direction. An apex opposite the base 430 may be oriented to serve as a directional indication by pointing towards the center of the semi-rigid tape measure 250 when viewed from above. The pencil aperture 420 may be a hole in the pointer 415 open from top to bottom. The diameter of the pencil aperture 420 may be substantially the same as the diameter of the pencil 365.

The pencil holder 400 is used by deploying it from within the case 200 and placing the pencil 365 into the pencil aperture 420. The pointer 415 of the pencil holder 400 will then indicate a measurement on the semi-rigid tape measure 250 when viewed from above and movement of the pencil 365 within the pencil aperture 420 may cause a mark corresponding to the measurement. As a non-limiting example, the pencil 365 and the pencil holder 400 may be used together to mark a length on material for cutting.

The first bubble level 460 may be a spirit level coupled to the outside of the case 200. The first bubble level 460 may be oriented from front to rear on the top of the case 200. When the bottom of the case 200 is placed on a horizontal surface, the first bubble level 460 may be read to determine if the horizontal surface is level.

The second bubble level 470 may be a spirit level coupled to the outside of the case 200. The second bubble level 470 may be oriented from top to bottom on the front or the rear of the case 200. When the bottom of the case 200 is placed against a vertical surface with the second bubble level 470 on the top, the second bubble level 470 may be read to determine if the vertical surface is plumb.

The writing surface 500 may be an area on the left side of the case 200 which may accept markings made by an erasable marker (not illustrated in the figures). The markings made by the erasable marker may be erased from the writing surface 500 by wiping them off with a cloth, paper towel, eraser, or finger. The markings made by the erasable marker may record measurements made using the semi-rigid tape measure 250, measurements made using the flexible tape measure 300, or other notations. As non-limiting examples, the writing surface 500 may be white in color and may be fabricated from melamine, painted or coated metal, ceramics, or plastic.

The magnetic mount 550 may be a magnetic surface coupled to the bottom of the case 200. The magnetic mount 550 may be used to hold the invention 100 in place while measurements are made using the semi-rigid tape measure 250 or while the first bubble level 460 or the second bubble level 470 are being used. In some embodiments, the case 200 may comprise a belt clip 600.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "anchor point" is a location to which a first object can be securely attached to a second object.

As used in this disclosure, an "aperture" is an opening in a surface. Aperture may be synonymous with hole, slit, crack, gap, slot, or opening.

As used in this disclosure, an "apex" is the point of an object that has the greatest height or altitude relative to a given reference.

As used herein, "approximate" and "approximately" indicate that information that is being presented is not critical for proper functioning of the invention and that the information is being provided only to assist in a better understanding of some physical characteristic of an embodiment of the invention. As a non-limiting example, a device that is described as "cubical and approximately 1 inch long on each side" is not required to be precisely 1 inch long on each side and the reader may understand that the device will likely fit in their pocket.

As used in this disclosure, an "axle" is a cylindrical shaft that is inserted through the center of an object such that the center axis of the object and the center axis of the axle are aligned and the object can rotate using the axle as an axis of rotation.

As used in this disclosure, a "cavity" is an empty space or negative space that is formed within an object.

As used in this disclosure, a "clip" is a fastener that attaches to an object by gripping or clasping the object. A clip is typically spring loaded.

As used in this disclosure, a "cord" is a flexible piece of string, line, rope, or wire that is at least several times its diameter in length. Cords may be made from threads, yarns, piles, or strands of material that are braided or twisted together, from a monofilament, or from one or more wires. Cords have tensile strength but are too flexible to provide compressive strength and are not suitable for use in pushing objects. String, line, cable, twine, and rope may be synonyms for cord.

As used herein, the words "couple", "couples", "coupled" or "coupling", refer to connecting, either directly or indirectly, and does not necessarily imply a mechanical connection.

As used in this disclosure, a "cylinder" is a geometric structure defined by two identical flat and parallel ends, also commonly referred to as bases, which are circular in shape and connected with a single curved surface which may be referred to as the face. The axis of the cylinder is formed by the straight line that connects the center of each of the two identical flat and parallel ends of the cylinder. Unless otherwise stated within this disclosure, the term cylinder specifically indicates a right cylinder which is defined as a cylinder wherein the curved surface perpendicularly intersects with the two identical flat and parallel ends.

As used in this disclosure, a "detent" is a device for positioning and holding one mechanical part in relation to another in a manner such that the device can be released by force applied to one or more of the parts. As a non-limiting example, a detent may be implements as a dimple on one part that seats into a depression on another part to hold a specific position. A force applied to the devices may cause the dimple to leave the depression and slide along a surface to allow movement.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, "flexible" refers to an object or material which will deform when a force is applied to it, which will not return to its original shape when the deforming force is removed, and which may not retain the deformed shape caused by the deforming force.

As used herein, the term "friction fit" refers to a type of mechanical coupling where a first component presses into a second component and is held there only by the friction of the first component against the second component. A friction fit is also known as a press fit.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, a "housing" is a rigid casing that encloses and protects one or more devices.

As used in this disclosure, the term "indicia" refers to a set of markings that identify a sentiment.

As used in this disclosure, a "lock" is a device that prevents the movement or operation of another device.

As used herein, the words "painted" or "tinted" refer to a change of coloration was produced using paint, ink, dyes, or other coloring agents; the method of producing such a coloration change may include pens, brushes, stamps, stencils, or other methods of applying a coloring agent.

As used herein, the words "printed" or "marked" refer to a mark that has been made on an object. The process of making the mark may involve printing, lithography, thermal transfer, painting, burning, silk-screening, drawing, stamping, spraying of pigments, or other processes which result in the controlled change of coloration of a surface.

As used in this disclosure, "resilient" or "semi-rigid" refer to an object or material which will deform when a force is applied to it and which will return to its original shape when the deforming force is removed.

As used herein, a "spirit level" or "bubble level" is an instrument that indicates whether a surface being tested is horizontal (level) or vertical (plumb). The level works on the principle that a liquid may incompletely fill a transparent container that comprises a curvature and that the bubble created by the incomplete filling will float to the center of the container when the container is horizontal. The level may comprise markings to make it clear that the bubble is at the center of the container. Even though centering of the bubble within the container relies upon a horizontal orientation of the container, vertical (plumb) measurements may be made if the container is mounted on a base that comprises a right angle with the container on a horizontal surface of the base and a vertical surface of the base pressed against the surface being tested.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used herein, the word "substantially" indicates that two or more values are the same except for a margin of error related to variances in materials, manufacturing processes, craftsmanship, installation, environmental conditions, or other factors that may influence the values and that such margin of error is tolerable.

As used in this disclosure, a "tether" is a cord, line, webbing, or strap that is attached to an object to restrict its movement.

As used in this disclosure, a "tool" is a device, an apparatus, or an instrument that is used to carry out an activity, operation, or procedure.

As used herein, "truss markings" and "stud markings" are indicia found on a tape measure that are useful when framing a building or laying out trusses. Truss markings commonly show as a black diamond symbol every 19.2 inches. Stud markings commonly take the form of red numbering and/or arrows every 16 inches.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A multi-use tape measure comprising:
a case, a semi-rigid tape measure, a flexible tape measure, a marking implement, a pencil holder, a first bubble level, a second bubble level, a writing surface, and a magnetic mount;
wherein the multi-use tape measure is a measuring tool that is adapted to provide multiple elements useful by a craftsman;
wherein the multiple elements measure straight-distance lengths, measure curved lengths, detect that surfaces are level or plumb, provide a place to record measurements, mark materials, and hold the multi-use tape measure in place;
wherein the semi-rigid tape measure is a ribbon of a semi-rigid material that is marked with first measurement indicia;
wherein the first measurement indicia comprises numbers, letters, lines, symbols, variations in coloring, or a combination thereof that appear on the semi-rigid tape measure;
wherein the first measurement indicia indicate one or more distances from a first hooked tab end of the semi-rigid tape measure to the points on the semi-rigid tape measure where the first measurement indicia appear;
wherein the first measurement indicia is in metric units, English units, or a combination thereof;
wherein the first measurement indicia comprises truss markings, stud markings, and/or other application specific markings;
wherein the semi-rigid tape measure is coiled within a first spring-loaded retraction mechanism inside of the case with one end of the semi-rigid tape measure coupled to the first spring-loaded retraction mechanism inside of the case and the other end of the semi-rigid tape measure coupled to the first hooked tab outside of the case;
wherein the semi-rigid tape measure is extended for use by manually pulling on a first hooked tab to withdraw the semi-rigid tape measure from within the case;
wherein the first hooked tab is a tab bent into a right-angle;
wherein the first hooked tab is attached to an edge of an object being measured, thus securing one end of the semi-rigid tape measure, while the case is moved away from the corner to withdraw the semi-rigid tape measure;
wherein the first hooked tab prevents the first spring-loaded retraction mechanism from pulling the semi-rigid tape measure entirely into the case;
wherein the first hooked tab comprises a first slotted aperture that allows the first hooked tab to be coupled to the head of a nail as an anchor point for a measurement;
wherein the flexible tape measure is coiled within a second spring-loaded retraction mechanism inside of the case with one end of the flexible tape measure coupled to the second spring-loaded retraction mechanism inside of the case and the other end of the flexible tape measure coupled to the second hooked tab outside of the case;
wherein the flexible tape measure is extended for use by manually pulling on the second hooked tab to withdraw the flexible tape measure from within the case;
wherein the second hooked tab is a tab bent into a right-angle;
wherein the second hooked tab is attached to an edge of an object being measured, thus securing one end of the flexible tape measure, while the case is moved away from the corner to withdraw the flexible tape measure;
wherein the second hooked tab prevents the second spring-loaded retraction mechanism from pulling the flexible tape measure entirely into the case;
wherein the second hooked tab comprises a second slotted aperture that allows the second hooked tab to be coupled to the head of a nail as an anchor point for a measurement.

2. The multi-use tape measure according to claim 1
wherein the case is a housing for the semi-rigid tape measure, the flexible tape measure, the marking implement, the pencil holder, the first bubble level, the second bubble level, and the writing surface;
wherein the case presents a square profile when viewed from the left or the right side and presents a rectangular profile when viewed from the front, the rear, the top, or the bottom.

3. The multi-use tape measure according to claim 2
wherein the first hooked tab comprises a magnetic tip to couple the first hooked tab to a metal object.

4. The multi-use tape measure according to claim 2
wherein the semi-rigid tape measure comprises the first spring-loaded retraction mechanism;
wherein the first spring-loaded retraction mechanism comprises a first axle and a first spring;

wherein the first axle is a cylinder around which the semi-rigid tape measure is wound;

wherein the first axle is rotationally coupled to the inside left and right walls of the case at the center of the left and right side walls;

wherein the first spring is coupled to the first axle and to one of the side walls of the case such that rotation of the first axle in a first rotational direction when the semi-rigid tape measure is withdrawn causes tension of the first spring and stores energy in the first spring;

wherein if the force causing the withdrawal of the semi-rigid tape measure is removed, the energy stored in the first spring causes rotation of the first axle in a second rotational direction, where the second rotational direction is opposite of the first rotational direction;

wherein rotation in the second rotational direction causes the semi-rigid tape measure to be retracted into the case and to wrap around the first axle.

5. The multi-use tape measure according to claim 4
wherein the multi-use tape measure comprises a tape lock located on the front side of the case;

wherein when the tape lock is in a locked position, the tape lock prevents the semi-rigid tape measure from moving;

wherein when the tape lock is in an unlocked position, the tape lock permits movement of the semi-rigid tape measure.

6. The multi-use tape measure according to claim 5
wherein the flexible tape measure is a ribbon of a flexible material that is marked with second measurement indicia;

wherein because of the flexible nature of the flexible tape measure, the flexible tape measure is useful for making measurements on curved surfaces;

wherein the second measurement indicia comprises numbers, letters, lines, symbols, variations in coloring, or a combination thereof that appear on the flexible tape measure;

wherein the second measurement indicia indicate one or more distances from a second hooked tab end of the flexible tape measure to the points on the flexible tape measure where the second measurement indicia appear;

wherein the second measurement indicia is in metric units, English units, or a combination thereof;

wherein the second measurement indicia comprises truss markings, stud markings, and/or other application specific markings.

7. The multi-use tape measure according to claim 6
wherein the flexible tape measure comprises the second spring-loaded retraction mechanism;

wherein the second spring-loaded retraction mechanism comprises a second axle and a second spring;

wherein the second axle is a cylinder around which the flexible tape measure is wound;

wherein the second axle is rotationally coupled to the inside left and right walls of the case at the top front quadrant of the left and right side walls;

wherein the second spring is coupled to the second axle and to one of the side walls of the case such that rotation of the second axle in a third rotational direction when the flexible tape measure is withdrawn causes tension of the second spring and stores energy in the second spring;

wherein if the force causing the withdrawal of the flexible tape measure is removed, the energy stored in the second spring causes rotation of the second axle in a fourth rotational direction, where the fourth rotational direction is opposite of the third rotational direction;

wherein rotation in the fourth rotational direction causes the flexible tape measure to be retracted into the case and to wrap around the second axle.

8. The multi-use tape measure according to claim 7
wherein the marking implement comprises a third spring-loaded retraction mechanism, a pencil, a pencil clip, and a tether;

wherein the pencil couples to the pencil clip in such a way that the pencil is detachable from the pencil clip for the purpose of replacing the pencil;

wherein when the pencil is not in use, it is stored within a pencil cavity;

wherein the tether is a tether line that is coupled at one end to the third spring-loaded retraction mechanism and at the other end to the pencil clip;

wherein the tether serves to prevent loss of the pencil.

9. The multi-use tape measure according to claim 8
wherein the third spring-loaded retraction mechanism comprises a third axle and a third spring;

wherein the third axle is a cylinder around which the tether is wound;

wherein the third axle is rotationally coupled to the inside left and right walls of the case at the top rear quadrant of the left and right side walls;

wherein the third spring is coupled to the third axle and to one of the side walls of the case such that rotation of the third axle in a fifth rotational direction when the tether is withdrawn causes tension of the third spring and stores energy in the third spring;

wherein if the force causing the withdrawal of the tether is removed, the energy stored in the third spring causes rotation of the third axle in a sixth rotational direction, where the sixth rotational direction is opposite of the fifth rotational direction;

wherein rotation in the sixth rotational direction causes the tether to be retracted into the case and to wrap around the third axle.

10. The multi-use tape measure according to claim 9
wherein the pencil holder is a guide that slides into and out of the front of the case above the semi-rigid tape measure;

wherein the pencil holder is deployed for use by pulling the pencil holder out of the case and is stored by pushing the pencil holder into the case;

wherein the pencil holder comprises an arm, a pointer, and a pencil aperture;

wherein the arm is an armature that is slidably coupled to the case;

wherein an internal end of the arm is retained within the case while an external end of the arm is coupled to the pointer;

wherein the pointer is oriented horizontally;

wherein the pointer is the shape of an isosceles or equilateral triangle;

wherein a base of the triangle is coupled to the arm such that the base of the triangle aligns with the arm along a front-to-rear direction;

wherein an apex opposite the base is oriented to serve as a directional indication by pointing towards the center of the semi-rigid tape measure when viewed from above;

wherein the pencil aperture is a hole in the pointer open from top to bottom;

wherein the diameter of the pencil aperture is substantially the same as the diameter of the pencil.

11. The multi-use tape measure according to claim 10 wherein the arm locks into place when the pencil holder is deployed, when the pencil holder is stored, or both.

12. The multi-use tape measure according to claim 10 wherein the first bubble level is a spirit level coupled to the outside of the case;
wherein the first bubble level is oriented from front to rear on the top of the case;
wherein when the bottom of the case is placed on a horizontal surface, the first bubble level is read to determine if the horizontal surface is level.

13. The multi-use tape measure according to claim 12 wherein the second bubble level is a spirit level coupled to the outside of the case;
wherein the second bubble level is oriented from top to bottom on the front or the rear of the case;
wherein when the bottom of the case is placed against a vertical surface with the second bubble level on the top, the second bubble level is read to determine if the vertical surface is plumb.

14. The multi-use tape measure according to claim 13 wherein the writing surface is an area on the left side of the case which accepts markings made by an erasable marker;
wherein the writing surface is white in color;
wherein the markings made by the erasable marker is erased from the writing surface by wiping them off with a cloth, paper towel, eraser, or finger;
wherein the markings made by the erasable marker records measurements or notations.

15. The multi-use tape measure according to claim 14 wherein the magnetic mount is a magnetic surface coupled to the bottom of the case;
wherein the magnetic mount is used to hold the multi-use tape measure in place while measurements are made using the semi-rigid tape measure or while the first bubble level or the second bubble level are being used.

16. The multi-use tape measure according to claim 15 wherein the case is fabricated from plastic, metal, or another resilient material;
wherein the semi-rigid tape measure is fabricated from metal;
wherein the flexible tape measure is fabricated from cloth, plastic, or fiberglass;
wherein the writing surface is fabricated from melamine, painted or coated metal, ceramics, or plastic.

* * * * *